US011509177B2

(12) United States Patent
Mihaila et al.

(10) Patent No.: US 11,509,177 B2
(45) Date of Patent: *Nov. 22, 2022

(54) MAGNET STRUCTURE WITH A PLURALITY OF INDIVIDUAL MAGNETS IN THE FORM OF BLOCKS

(71) Applicant: WHYLOT SAS, Cambes (FR)

(72) Inventors: Vasile Mihaila, Figeac (FR); Loic Mayeur, Saint Santin (FR); Huguette Tiegna, Figeac (FR); Romain Ravaud, Labastide-Murat (FR)

(73) Assignee: WHYLOT SAS, Cambes (FR)

( * ) Notice: Subject to any disclaimer, the term of this patent is extended or adjusted under 35 U.S.C. 154(b) by 428 days.

This patent is subject to a terminal disclaimer.

(21) Appl. No.: 16/494,999

(22) PCT Filed: Mar. 21, 2018

(86) PCT No.: PCT/FR2018/000066
§ 371 (c)(1),
(2) Date: Sep. 17, 2019

(87) PCT Pub. No.: WO2018/172636
PCT Pub. Date: Sep. 27, 2018

(65) Prior Publication Data
US 2020/0036236 A1    Jan. 30, 2020

(30) Foreign Application Priority Data

Mar. 22, 2017 (FR) .................................... 1700295
Sep. 8, 2017 (FR) .................................... 1700906

(51) Int. Cl.
*H02K 1/02* (2006.01)
*H02K 1/04* (2006.01)
(Continued)

(52) U.S. Cl.
CPC ......... *H02K 1/2793* (2013.01); *H01F 7/0221* (2013.01); *H01F 41/0253* (2013.01);
(Continued)

(58) Field of Classification Search
CPC .. H02K 1/02; H02K 1/04; H02K 1/17; H02K 1/27; H02K 1/2706; H02K 1/2786;
(Continued)

(56) References Cited

U.S. PATENT DOCUMENTS 5,619,087 A * 4/1997 Sakai ...................... H02K 1/12
310/156.36
6,137,203 A * 10/2000 Jermakian ............ H02K 1/2793
310/191
(Continued)

FOREIGN PATENT DOCUMENTS

EP      0996212     4/2000
EP      1624555     2/2006
(Continued)

OTHER PUBLICATIONS

International Search Report dated May 30, 2018 from International Application No. PCT/FR2018/000062.
(Continued)

*Primary Examiner* — Eric Johnson
(74) *Attorney, Agent, or Firm* — Crockett & Crockett, PC; K. David Crockett, Esq.; Niky Economy Syrengelas, Esq.

(57) ABSTRACT

A magnet structure comprising a plurality of individual magnets in the form of an elongate block (4) having a length (4a) extending beyond the thickness of the magnet structure. The elongate block (4) is cylindrical or polyhedral in shape with at least one flat longitudinal face (4b) orientated towards a working surface of the magnet structure, the elongate block (4) having a line of magnetisation extending
(Continued)

along its length. The individual magnets (4) being positioned at a distance from each other in the magnet structure in order to be electrically isolated from each other, the length (4a) of each block (4) being greater than the diameter of the flat longitudinal face (4b) for a cylindrical block (4) or with a larger diagonal (4c) connecting two apexes of said longitudinal face (4b) for a block (4) in the form of a polyhedron.

11 Claims, 6 Drawing Sheets (51) Int. Cl.
H02K 1/27 (2022.01)
H02K 15/03 (2006.01)
H02K 21/24 (2006.01)
H02K 41/03 (2006.01)
H01F 7/02 (2006.01)
H02K 1/2793 (2022.01)
H02K 3/46 (2006.01)
H02K 21/12 (2006.01)
H02K 1/12 (2006.01)
H02K 5/04 (2006.01)
H01F 41/02 (2006.01)
H02K 1/28 (2006.01)
H02K 15/12 (2006.01)
H02K 16/04 (2006.01)
H02K 7/00 (2006.01)

(52) U.S. Cl.
CPC ................. *H02K 1/02* (2013.01); *H02K 1/04* (2013.01); *H02K 1/12* (2013.01); *H02K 1/27* (2013.01); *H02K 1/28* (2013.01); *H02K 3/46* (2013.01); *H02K 5/04* (2013.01); *H02K 15/03* (2013.01); *H02K 15/12* (2013.01); *H02K 16/04* (2013.01); *H02K 21/12* (2013.01); *H02K 21/24* (2013.01); *H02K 41/031* (2013.01); *H01F 7/021* (2013.01); *H02K 7/003* (2013.01)

(58) Field of Classification Search
CPC ........ H02K 1/2793; H02K 1/28; H02K 15/03; H02K 21/12; H02K 21/14; H02K 21/22; H02K 21/24; H02K 41/031; H02K 2213/12; H01F 7/021; H01F 7/0221; H01F 7/0253; H01F 41/0253; H01F 41/0266
See application file for complete search history.

(56) References Cited

U.S. PATENT DOCUMENTS

2006/0238056 A1* 10/2006 Alvarez ................. H02K 21/24
                                                          310/156.35
2011/0079325 A1*  4/2011 Doi ...................... H02K 1/2766
                                                          148/108
2011/0285237 A1  11/2011 Amari et al.
2013/0146453 A1   6/2013 Foo

FOREIGN PATENT DOCUMENTS

| EP | 1780878 | 5/2007 | | |
|---|---|---|---|---|
| EP | 1982403 | 10/2008 | | |
| EP | 2043230 | 4/2009 | | |
| EP | 2306619 | 4/2011 | | |
| EP | 2333935 | 6/2011 | | |
| EP | 2773023 | 9/2014 | | |
| FR | 1475501 | 3/1967 | | |
| FR | 2996378 | 4/2014 | | |
| FR | 2996378 A1 * | 4/2014 | ........... H02K 1/2793 |
| FR | 3014255 | 6/2015 | | |
| JP | 10121236 | 5/1998 | | |
| JP | 2004007937 A * | 1/2004 | | |
| JP | 2005198365 A * | 7/2005 | | |
| JP | 2005341696 | 12/2005 | | |
| JP | 2015202514 | 11/2015 | | |
| WO | WO2016116678 | 7/2016 | | |

OTHER PUBLICATIONS

International Search Report dated Jun. 13, 2018 from International Application No. PCT/FR2018/000063.
International Search Report dated Jun. 12, 2018 from International Application No. PCT/FR2018/000064.
International Search Report dated Jun. 12, 2018 from International Application No. PCT/FR2018/000066.

* cited by examiner

MAGNET STRUCTURE WITH A PLURALITY OF INDIVIDUAL MAGNETS IN THE FORM OF BLOCKS

FIELD OF THE INVENTIONS

The invention relates to a magnet structure with a plurality of individual magnets in the form of blocks. The invention further relates to an electromagnetic actuator comprising one or more such magnet structures.

BACKGROUND

This invention is advantageously but not restrictively applied to an electromagnetic actuator that delivers high power with a high speed of rotation of the rotor, which is achieved by the use of one or more magnet structures according to the invention. An electromagnetic actuator of this type can be used, for example, in a fully electric or hybrid automotive vehicle.

Advantageously but not restrictively, the actuator can be a rotary actuator that can comprise at least one motor bracketed by two stators, whereby these elements can be superimposed on one another and can be separated by at least one air gap on the same shaft.

In high-speed applications it is necessary to have not only a compact system made possible by the reduction of the weight and size of the electromagnetic actuator for optimal performance, but also very good mechanical strength of the part that is rotating or in translation, i.e. the rotor or the element in linear translation, to improve the reliability of the system.

In high-speed applications it is necessary to reduce losses to achieve optimal performance. Miniaturization is an increasingly desirable objective in automotive applications. To achieve that, it is important to have a compact system made possible by the reduction of the weight and size of the actuator, but also very good mechanical strength of the part in displacement, to improve the reliability of the system.

For an electromagnetic actuator with axial flux as a non-restrictive example of the present invention, the rotor comprises a body in the form of a disc that has two circular faces connected by a thickness, the disc being delimited between an outer ring and an inner periphery delimiting an empty space for a rotation shaft.

At least two permanent magnets are applied against at least one of the two circular faces of the body called a support face for a rotor with a single air gap intended to be associated with a stator, a single circular face of the body carriers magnets, while for a rotor with two air gaps with a respective stator, it is the two faces that carry the magnets.

The magnets are each held on the face or their respective face by retention means, an interval being left between these at least two magnets on a given face.

For an electromagnetic actuator with radial flux, the rotor comprises a cylindrical body, the entire circumference of which carries magnets.

The stator or each stator carry coil elements that comprise a tooth carrying a coil, the tooth being bordered on each of its sides by a notch, a wire made of a good conductor metal being wound around the tooth to form the coil.

When the one or more series of windings are supplied with electricity, the rotor, which is rigidly fastened to the output shaft of the motor, is subjected to a torque resulting from the magnetic field, the magnetic flux created being an axial flux for an electromagnetic machine with axial flux and a radial flux for a machine with radial flux.

SUMMARY

For a high-power motor, the rotor rotates at high speeds of rotation. The principal disadvantage of a motor with a high speed of rotation resides in the high probability of the detachment of the magnet or magnets of the rotor as well as the at least partial breakage of the rotor. The rotor of a motor of this type must therefore be capable of withstanding high speeds of rotation.

Prior art document US-A-2011/0285237 discloses a motor with an axial airgap. The object of this prior art document is a simplification of the steps in the fabrication of the rotor while preventing the permanent magnets carried by this rotor from being displaced or unscrewed during the assembly and operation of the rotor. The magnets are housed in a one-piece structure made of a cast part that surrounds the magnets.

The cast part has grooves that separate the magnets, into which are introduced the ribs carried by a body of the rotor, making it possible to immobilize the cast part to prevent an axial displacement movement. The cast part is retained radially by internal and external elements that are concentric to the cast part.

The subject matter of this prior art document is therefore magnets that are housed in a molded part and it contains no teaching with regard to magnets that are separated from one another. Moreover, the ribs retain the magnets only by their action on the molded part and therefore not by directly retaining the magnets in the rotor.

Prior art document FR-A-1 475 501 describes permanent magnet poles for permanent magnet systems constituted by a bundle of straight magnets having a round or polygonal cross-section, the magnets being assembled into a block of poles by means of a cast resin or other synthetic materials.

The pole of permanent magnets, which is similar to a structure of individual magnets, is however not stable at high speeds of rotation, the permanent magnets being individually retained only by the cast resin. There is no protection of the magnet structure as a whole.

Prior art document JP-A-H10 121236 describes a three-dimensional magnet structure constituted by a plurality of individual magnets. Each individual magnet is in the form of any elongated block having a length extending along the thickness of the structure, the elongated block being cylindrical and having a line of magnetization extending along its length. The individual magnets are positioned in the structure at a distance from one another so that they are electrically isolated from one another, the length of each block being greater than the diameter of the flat longitudinal face for a cylindrical block.

This prior art document does not describe any means of reinforcement of the structure thus formed that might protect it against high speeds of rotation and prevent the detachment of the individual magnets.

The problem addressed by this invention is to design a magnet structure for an electromagnetic actuator that can withstand high working speeds while delivering a powerful magnetic field.

For this purpose, this invention relates to a three-dimensional magnet structure constituted by a plurality of individual magnets, the magnet structure having a thickness forming its smallest dimension, each individual magnet being in the form of an elongated block having a length extending along the thickness of the structure, the elongated block being cylindrical or in the form of a polyhedron with at least one flat longitudinal face oriented toward a working surface of the structure, the elongated block having a line of magnetization extending along its length, the individual magnets being positioned in the structure at a distance from one another so that they are electrically isolated from one another, the length of each block being greater than the diameter of the flat longitudinal face for a cylindrical block or a longer diagonal line connecting two apexes of this longitudinal face for a block in the form of a polyhedron, characterized in that the magnet structure comprises a layer of non-conducting composite coating the individual magnets, the composite layer delimiting an exterior outline of the magnet structure.

The working surface of the magnet structure is the one that will be opposite the coils of the stator for a rotating or linear electromagnetic actuator and is the surface from which the magnetic field is emitted.

According to its most conventional definition, a polyhedron is a three-dimensional geometric shape having polygonal flat faces that intersect along straight-line segments that are called edges, for example a straight or oblique prism, a cube or a pyramid. In the framework of the present invention, it is preferable to have a polyhedron that has two opposite, plane and equal longitudinal polygonal surfaces connected by edges that are straight and parallel such as a hexagonal polyhedron, although the invention is not limited to this design, whereby a single longitudinal surface can be present, with a peak on the other extremity of the polyhedron.

This configuration makes it possible to have a magnet structure that has numerous blocks forming individual magnets. It has been determined that a structure with a plurality of individual magnets has a high magnetization capacity as well as high strength, whereby the magnet structure preferably has a layer of composite material for the coating of the individual magnets. A magnet structure of this type can form a magnet pole or be a complete magnet.

The object of the present invention is to break down a magnet structure, which can be a whole magnet or a magnetic pole of the prior art, into a plurality of small magnets or micro-magnets. A large magnet is subject to losses by Foucault currents that are greater than its equivalent in small magnets or micro-magnets. The use of small magnets or micro-magnets can therefore reduce these losses which are prejudicial to the operation of the electromagnetic actuator.

It is known that, to obtain a magnetic field of optimal intensity, the ideal volume of a magnet must approach that of a cube or a cylinder, the length of which is equal to the diameter. It is common knowledge that increasing the length of a magnet beyond that does not result in any increase in the magnetic field. However, the approach taken by the present invention runs contrary to this preconceived idea.

The length of an individual magnet is significantly longer than the diameter or to a diagonal of its plane longitudinal face, which is not suggested by widespread practice, and is essentially to respond to the requirements for the mechanical strength of the structure.

According to the invention, it has been discovered that a plurality of individual magnets in a magnet structure gives a magnet structure that has a much greater mechanical strength, while retaining magnetic properties that are almost similar to those of a single magnet having a surface area equal to n times the elementary surface of the n individual magnets when there are n individual magnets.

The layer of nonconducting composite coaching the individual magnets and the entire magnetized structure makes it possible to solidify the assembly. The composite material is preferred to iron because it does not induce a detent torque or additional losses.

Moreover, the mechanical strength of a layer of composite can be high and the coating can easily be applied, in particular by injection of the composite over an arrangement of individual magnets held in place in relation to one another by any means. Therefore there is no risk of detachment of the magnets at high speeds of rotation.

Advantageously a ratio of a surface area of the longitudinal face of the block to the working surface area of the structure is less than 2%.

This makes it possible to have a very high number of blocks on the longitudinal face of the block, the space occupied by a block compared to the working surface of the structure being very small.

Each block advantageously has its flat longitudinal face in a hexagonal shape.

The layer of composite material advantageously comprises reinforcing fibers such as glass fibers or fibers of plastic material.

The reinforcement fibers contribute to increasing the strength of the magnet structure and in particular the rigidity in response to flexing and buckling.

The structure advantageously comprises at least one mesh structure comprising a plurality of housings for a respective individual magnet.

The mesh structure remains in place, being coated in the layer of composite material. A mesh structure of this type makes it possible to hold the individual magnets during the fabrication of the magnet structure and has the advantage of representing an additional solidification element of the magnet structure, whereby the mesh structure can also contain reinforcement fibers.

The at least one mesh structure is advantageously in the form of a honeycomb and has housings with a hexagonal cross-section.

A honeycomb mesh structure is known to reinforce the strength of an element, in this case a magnet structure. The individual magnets are inserted in hexagonal housings that ensure their retention. The walls of the housings act as electrical insulators and the density of the housings in the magnet structure can be significantly increased. The honeycomb mesh structure can be made of fiber-reinforced electrically insulating composite material.

Each individual magnet is advantageously adhesively bonded in a respective housing by a fiber-reinforced resin.

In the framework of one preferred embodiment of the invention, the composite coating layer, the mesh structure surrounding the individual magnets and the adhesive bonding means of the magnets in the housings 5 of the mesh structure can all three be fiber-reinforced. The magnet structure thereby obtained has very high rupture strength mechanical characteristics.

The structure advantageously comprises a stack of two series of individual magnets, each individual magnet of the series being aligned in the direction of its length with a prospective individual magnet of the other series with which it is placed end to end.

Each pair of two individual magnets of different series connected end to end by magnetic attraction behaves like a longer single magnet.

The structure advantageously comprises a stack of two series of at least two individual magnets, the two series being stacked one on the other, a layer of composite being interposed between the two stacks series.

This makes it possible to have a magnet structure that can have a working surface area over two opposite faces of the structure, whereby this magnet structure can be used in an electromagnetic actuator on a rotor bracketed by two stators.

A single-layer or multi-layer material is advantageously introduced into a space between the housing and the individual magnet.

This material can be a plastic, a composite or a metal coating material for the individual magnets such as nickel or copper. The material can have been deposited on the individual magnet prior to its introduction into the mesh structure, whereby it can for example be a coating material, or it can perform the function of forming a rigid connection between the individual magnet and the mesh structure that holds it.

The invention further relates to a linear or rotating electromagnetic actuator, characterized in that it comprises a single magnet structure or a plurality of magnet structures, whereby the magnet structure or structures form a rectangular assembly or are part of a rotor that rotates around its center, and the magnet structures are arranged in concentrically with respect to the rotor.

As stated above, the magnet structures can form magnetic poles or the magnet structure can form a complete magnet. In the case of magnetization poles, these are kept spaced from one another by branches. The rotor for a rotating electromagnetic actuator or the translation support for a linear actuator can also be made of a fiber-reinforced composite material. In the case of magnetic poles, branches can separate to adjacent poles.

BRIEF DESCRIPTION OF THE DRAWINGS

Advantageously, when there is only one magnet structure, it forms a single magnet that extends over the actuator or, when there is a plurality of magnet structures, they are successive tiles that form successive alternating magnet poles.

Advantageously, when the actuator is an actuator with an axial flux, there are a plurality of magnet structures, being successive tiles forming successive alternating magnet poles, the magnet structures being housed in at least one support comprising branches delimiting housings between them, each of which holds a respective magnet structure, the at least one support being part of a rotor and having a partly hollowed disk shape comprising branches extending essentially radially or at an inclination in the radial direction of the rotor, the at least one disc-shaped support being covered on at least one face by a covering disc as axial retention means for the consolidation of the rotor.

DETAILED DESCRIPTION OF THE INVENTIONS

The rotor advantageously has a peripheral external rim forming its edge, a binding band being installed on the peripheral external rim and making it possible to retain the magnet structures.

The invention also relates to a fabrication method for a magnet structure of this type, characterized in that it comprises the following steps:
cutting, from a magnetized tile having a length, width and thickness forming three dimensions of the tile, of a plurality of individual magnets along the three dimensions of the magnetized tile,
positioning and holding of the individual magnets at a distance from one another,
injection of a layer of composite around the individual magnets to coat them.

For a three-dimensional cutting and in particular in the width and length of the tile, it has been found that the individual magnets have magnetic properties that are improved over the properties of a comparable portion of the magnetic tile.

The individual magnets can be positioned by placing the magnets in a mesh structure, in which case the mesh structure is part of the magnet structure that is coated in the composite layer. Alternatively, the positioning can be performed on the exterior of a mockup of the magnet structure that is not part of the final coated magnet structure.

Advantageously, the positioning is performed by the introduction of the individual magnets into a mesh structure and the injection of the layer of composite around the mesh structure.

This is the preferred embodiment of the method according to the invention, the mesh structure remaining in the magnet structure after coating by the layer of composite, the mesh structure being advantageously in the form of a honeycomb.

Additional characteristics, objectives and advantages of the present invention are described in greater detail below and with reference to the accompanying drawings which are provided merely by way of non-restricting examples and in which.

The illustrations are presented by way of example and in no way restrict the invention. They constitute schematic representations intended to facilitate an understanding of the invention and are not necessarily drawings to scale of practical applications. In particular, the dimensions of the different parts are not representative of reality.

With reference to all the Figures and in particular to FIGS. 4, 5a, 5b, 6a and 6b, as well as to the other Figures for the reference numbers not indicated in these first Figures, this invention relates to a three-dimensional magnet structure 6 constituted by a plurality of individual magnets 4. The magnet structure 6 can be in the form of a tile having a width, length and thickness, the thickness forming the smallest dimension of the magnet structure 6.

Figure 4:
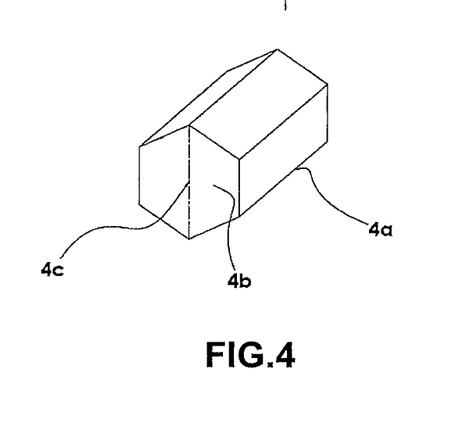
FIG. 4 is a schematic representation of a view and perspective of a block serving as a single magnet in a magnet structure according to the present invention.
Figures 6A, 6B:
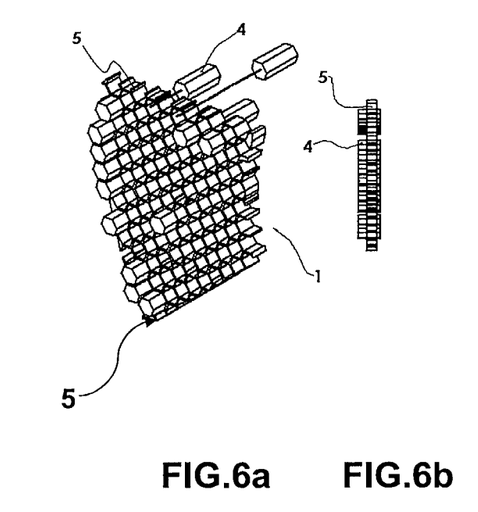
FIGS. 6a and 6b are schematic representations respectively of a perspective view and a side view of a honeycomb that can act as the mesh structure surrounding the blocks that form the individual magnets in a magnet structure according to this invention.

According to the invention, each individual magnet 4 is in the form of an elongated block 4, visible in particular in FIG. 4, having a length 4a extending along the thickness of the magnet structure 6, as can be seen in FIGS. 6a and 6b. The elongated block 4 is cylindrical or in the shape of a polyhedron with at least one flat longitudinal face 4b oriented toward a work surface of the magnet structure 6 which is the surface facing the windings in a rotating or linear electromagnetic actuator.

The elongated block 4 has a line of magnetization that extends approximately along its length, the individual magnets 4 being positioned in the magnet structure 6 at a distance from one another so that they are electrically isolated from one another.

The length 4a of each block 4 is greater than the diameter of the flat longitudinal face for a cylindrical block, which is not shown in the Figures, or a longer diagonal line 4c connecting to apexes of this longitudinal face 4b for a block 4 in the shape of a polyhedron. For a regular longitudinal face 4b such as a hexagon, all the diagonals 4c are equal.

Moreover, a ratio of one surface area of the longitudinal face 4b of the block to the total working surface area of the magnet structure 6 can be less than 2%, which shows that an individual magnet 4 occupies very little space out of the total working surface of the magnet structure 6. This makes it possible to have a very high number of blocks 4 on the longitudinal face 4b of the block 4.

As shown in FIG. 4, each block 4 forming an individual magnet 4 has its flat longitudinal face 4b in the shape of a hexagon. This makes it possible, for example, to insert each block 4 in a cavity of a honeycomb mesh structure 5a.

The magnet structure 6 comprises a layer of non-conducting composite material coating 21 coating the individual magnets 4. The entire contour of the magnet structure 6 can be delimited by this composite layer.

The composite preferably does not contain iron so that it does not induce a detent torque or additional losses.

The layer of composite can comprise reinforcement fibers such as glass fibers or fibers made of plastic material, for example Kevlar or polyamide or any plastic material that increases the mechanical strength of the assembly.

In one very advantageous preferred embodiment, the magnet structure 6 can comprise at least one mesh structure 5a comprising a plurality of housings 5 or cells for a respective individual magnet 4.

The mesh structure 5a, when present, can remain in place, being coated in the layer of composite material. The mesh structure 5a can also contain reinforcement fibers.

Advantageously, the at least one mesh structure 5a is in the form of a honeycomb having housings 5 with a hexagonal cross-section, which reinforces the mechanical strength of the magnet structure 6. This can also be seen in FIGS. 6a and 6b.

A mesh structure 5a isolated from the magnet structure 6 is illustrated in FIGS. 6a and 6b. The housings 5 or cells do not surround their associated block 4 over its entire length.

Each individual magnet 4 is adhesively bonded in a respective housing by a fiber-reinforced resin. For example, without this configuration being restrictive, the individual magnets 4 can be neodymium iron boron magnets or samarium cobalt magnets or any other type of magnet. The neodymium magnets are sensitive to impacts and to torsion and are highly flammable. By reducing their dimensions by division, this invention makes it possible to eliminate all these risks and in particular the risks of breakage of the magnets.

In the framework of one preferred embodiment of the invention, the composite coating layer, the mesh structure 5a surrounding the individual magnets 4 and the adhesive bonding means of the magnets in the mesh structure 5a can all three be fiber-reinforced. The magnet structure 6 thereby obtained has very high rupture strength mechanical characteristics.

In a first preferred embodiment not illustrated in the Figures, the magnet structure 6 can comprise a stack of two series of individual magnets 4, each individual magnet 4 of one series being aligned in the direction of its length with a respective individual magnet 4 of the other series with which it is placed end to end. Each pair of two individual magnets of different series connected end to end by magnetic attraction behaves like a longer single magnet.

In a second preferred embodiment not illustrated in the Figures, the magnet structure 6 can comprise a stack of two series of a plurality of individual magnets 4, the two series being stacked one on the other and a layer of composite being interposed between the two stacked series. The two stacked series are thus electrically isolated from one another.

This makes it possible to have a magnet structure 6 that can have a working surface over two opposite faces of the magnet structure 6, whereby this magnet structure 6 can be used, for example, in a rotating electromagnetic actuator for a rotor 1, 1a bracketed by two stators. In FIG. 2b, for example, the two series of individual magnets 4 of each magnet structure 6, only one of which is identified as 6 in this Figure, can form magnet structures 6 with two series of magnets coated in the same composite layer, one series being electrically isolated from the other series.

Figure 1A:
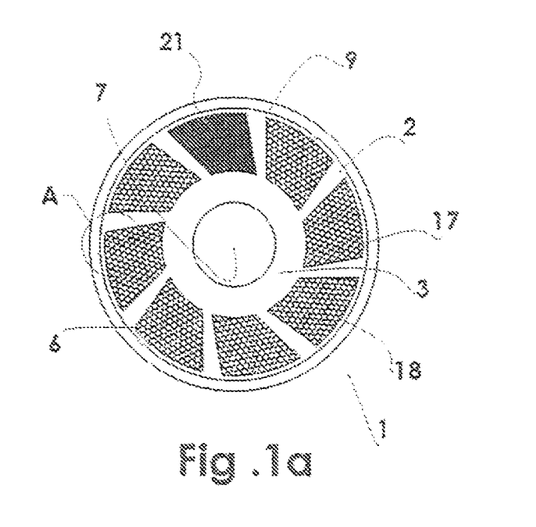
FIG. 1a is a schematic representation of a view of one face of a rotor intended for an electromagnetic actuator with an axial flux according to a first embodiment of the invention.
Figure 1B:
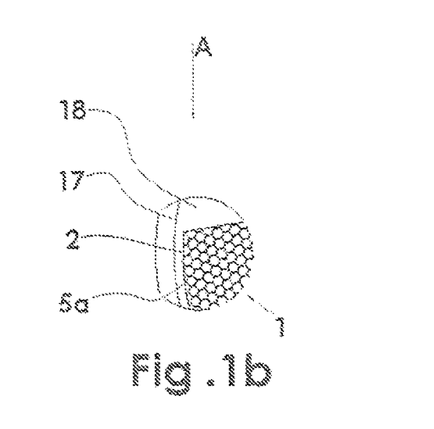
FIG. 1b is a schematic representation of an enlarged view of the circled part referenced A in FIG. 1a, FIG. 1c is a schematic representation of an enlarged view of the magnet structure composed of the mesh structure and individual magnets.
Figure 2A:
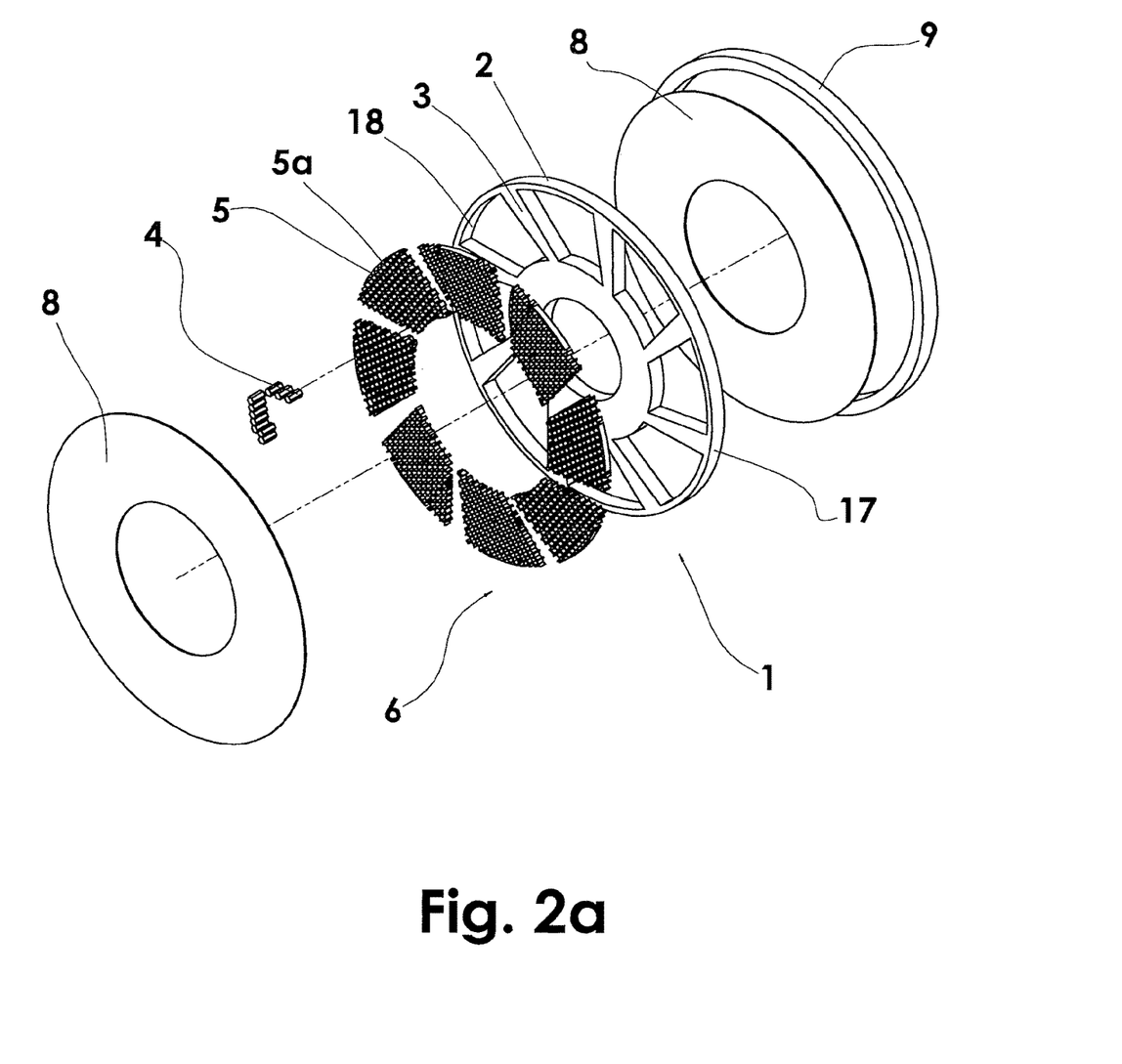
FIG. 2a is a schematic representation of an exploded view of a first embodiment according to the present invention of a rotor intended for an electromagnetic actuator with an axial flux.
Figure 2B:
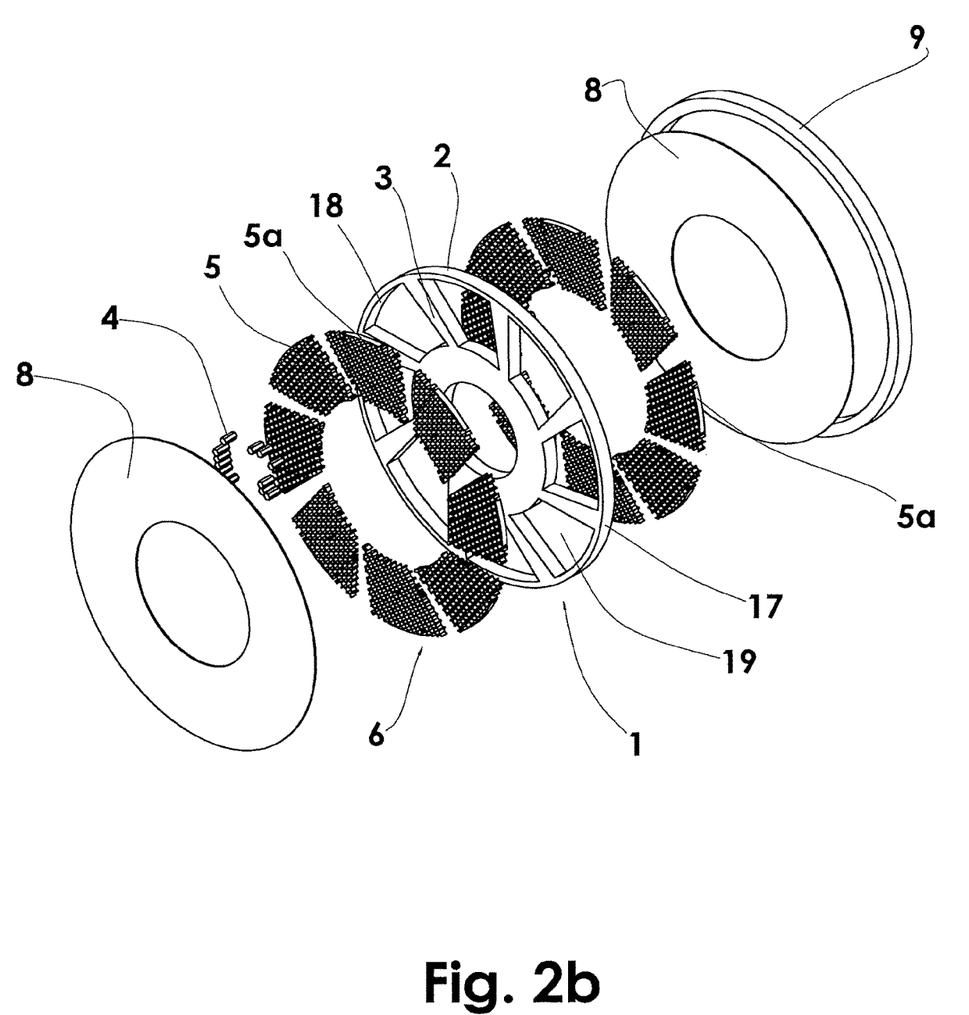
FIG. 2b is a schematic representation of an exploded view of a second embodiment according to the present invention of a rotor intended for an electromagnetic actuator with an axial flux.

The invention also relates to a linear or rotating electromagnetic actuator, although only a rotating electromagnetic actuator is illustrated in FIGS. 1a, 2a. This actuator can be an actuator with a radial flux or an axial flux or a combination of the two.

The linear or rotating electromagnetic actuator comprises one such magnet structure 6 or a plurality of magnet structures 6, in which case they can be separated from one another by branches 3.

The magnet structure or structures 6 can form a rectangular assembly for a linear actuator, whereby the magnet structures 6 are aligned one after another. The magnet structures 6 can be part of a rotor 1, 1a, rotating around its center for a rotating actuator, in which case the magnet structure or structures 6 are oriented concentrically with respect to the rotor 1, 1a.

The rotor 1, 1a for a rotating electromagnetic actuator or the translation support for a linear actuator can also be made of a fiber-reinforced composite material.

Figure 5A:
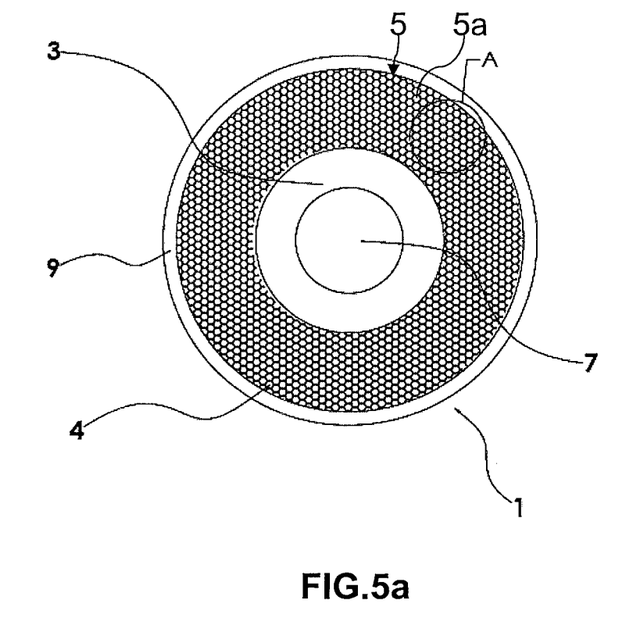
FIGS. 5a and 5b are schematic representations of plan views respectively of a magnet structure forming a single magnet and an enlarged view of a portion of this magnet structure.
Figure 5B:
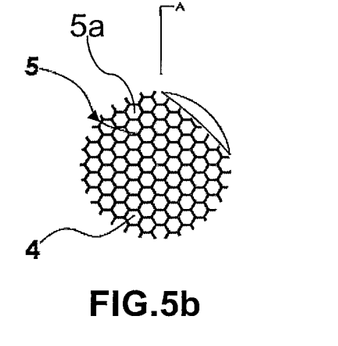

Advantageously, when there is a single magnet structure, the magnet structure 6 can form a single magnet extending over the actuator. This is shown in FIG. 5a. When there are a plurality of magnet structures, the magnet structures 6 are successive tiles that form alternating successive magnet poles. This is shown in particular in FIG. 2a.

The invention also relates to a method for the fabrication of a magnet structure 6. The method comprises a step of cutting, from a magnetized tile having a length, width and thickness forming three dimensions of the tile, a plurality of individual magnets 4 along the three dimensions of the magnetized tile. The next step is a step of positioning and retention the individual magnets 4 at a distance from one another to electrically isolate them.

The final step is a step of injecting a composite layer around the individual magnets 4 to coat them. The individual magnets can be positioned by placing the magnets in a mesh structure 5a, in which case the mesh structure 5a is part of the magnet structure 6 and is coated in the composite layer. Alternatively, the positioning can be performed on the exterior of a mockup of the magnet structure 6 that is not part of the final coated magnet structure 6.

Advantageously, the positioning is performed by the introduction of the individual magnets 4 into a mesh structure 5a and the injection of the layer of composite around the mesh structure 5a.

With reference to FIGS. 1a to 1c, 2a, 2b and 3, the Figures show a rotor 1, 1a of an electromagnetic motor or generator having at least one support 2, 2a housing a plurality of individual magnets 4. For example, there can be a support 2, 2a on each side of the rotor or in the interior of the rotor, depending on whether the rotor is a rotor with an axial flux or a radial flux.

Figure 1C:
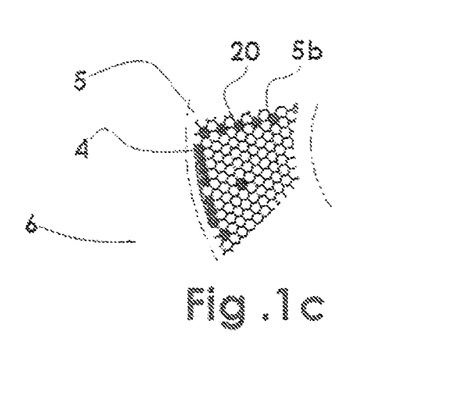

This at least one support 2, 2a comprises branches 3, 3a which between them delimit cavities, each of which holds a respective magnet structure 6 that can be composed of a mesh structure 5a comprising housings or cells 5 and individual magnets 4, each individual magnet 4 being inserted into a respective housing or cell 5, whereby the magnet structure 6 forms a magnet pole or a whole magnet. FIG. 1c shows a view on a larger scale than FIG. 1a of a magnet structure 6 of this type.

The objective of the present invention is to replace one or more large magnets with a plurality of small individual magnets 4. To accomplish that, a magnetic flux is created by a multitude of small individual magnets 4, the number of which is at least 20 and can be greater than 100 or even significantly more, per magnet structure. A rotor of the prior art can comprise from 1 to 5 magnets while the present invention provides many more small individual magnets 4. The small individual magnets 4 according to the present invention can be inserted into the respective cells 5 by a robot. For a medium-size rotor, the small magnets 4 in the framework of the present invention can have a dimension of 4 mm.

In a first preferred embodiment of the invention, the rotor is a rotor with a radial flux and is therefore intended for use in a motor or generator with a radial flux. In this embodiment, the at least one support 2a is cylindrical and comprises branches 3a.

Figure 3:
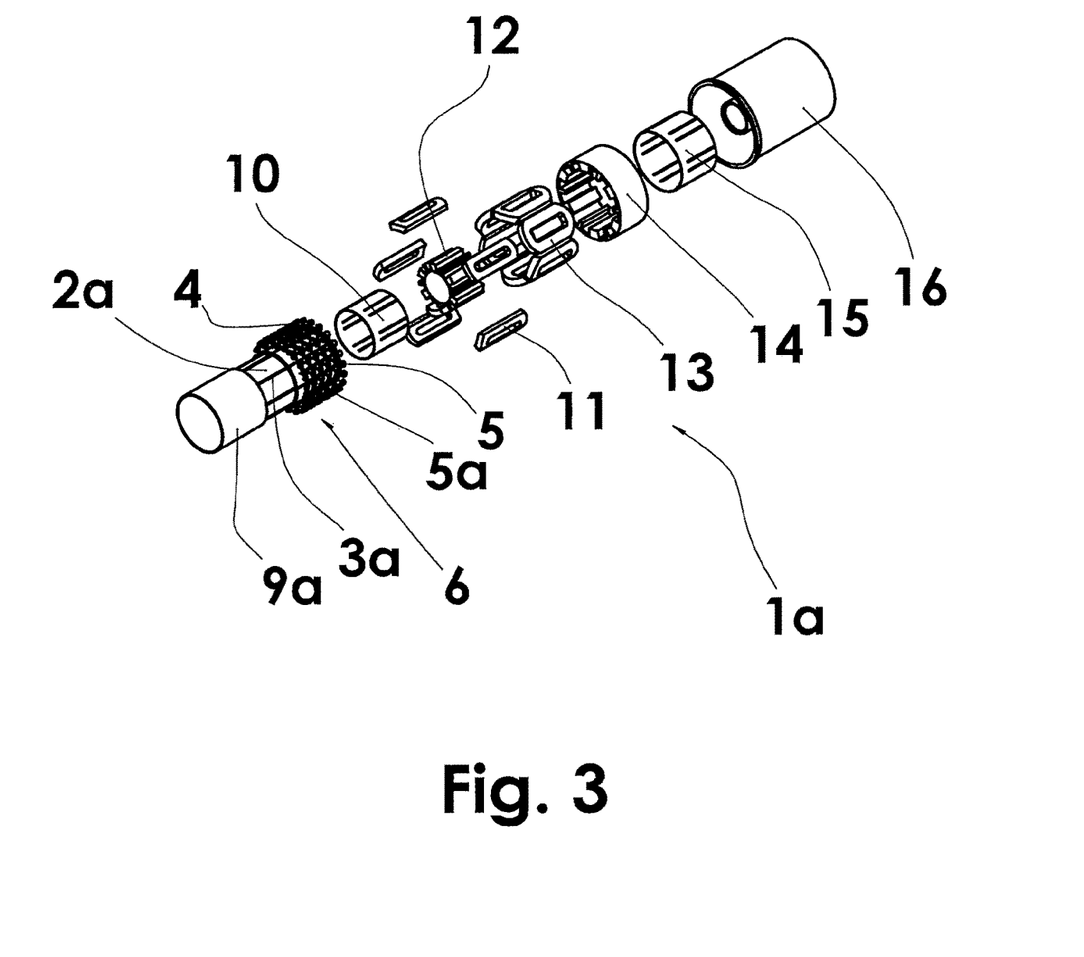
FIG. 3 is a schematic representation of an exploded view of one embodiment according to the present invention of an electromagnetic actuator with a radial flux.

In the embodiment illustrated in FIG. 3, which shows an electromagnetic actuator with a radial flux with two stators and one rotor 1a, the cylindrical rotor 1a with a radial flux has a cylindrical support 2a that can have separation branches 3a which can extend axially over the cylindrical support 2a. The separation branches 3a axially delimit the magnet structures 6 composed of the mesh structure 5a and the individual magnets 4. The cylindrical support 2a can be hollowed out between the separation branches 3a to hold magnet structures 6 composed of the cellular mesh structure 5a and the individual magnets 4.

A binding band 9a covers one extremity of the rotor 1a in proximity to the cylindrical support 2a. Inserted into the interior of the cylindrical support 2a is an inside covering cylinder 10 and an exterior covering cylinder 15 extends over the outside of the cylindrical support 2a on the external periphery of the cylindrical support 2a.

A first stator is located in the interior of the rotor 1a and has an internal magnetic circuit 12 that carries coils 11. The interior covering 10 covers the internal magnetic circuit 12.

A second stator is located on the outside of the rotor 1a surrounding it and has an external magnetic circuit 14 that includes coils 13 in its interior. The outside covering 15 is located between the coils 13 and the external magnetic circuit 14. A casing 16 covers the assembly of the rotor 1a and the two stators.

In another embodiment not illustrated in FIG. 3, the branches can be in the form of rings spaced one after another in the axial direction of the cylindrical support. The successive branches can project radially on the periphery of the at least one support. The at least one cylindrical support can be hollowed out so that it has, between two successive branches, a housing to hold a magnet structure composed of the mesh structure and the individual magnets.

The magnet structures 6 composed of the mesh structure 5a and the individual magnets 4 used for a cylindrical support can each be in the form of a closed ring or tiles located at some distance from one another. Otherwise, the arrangement of the stators and optional covering cylinders or binding band in the radial flux actuator according to this other embodiment can be similar to that shown in FIG. 3. This other embodiment is not preferred.

In a second preferred embodiment of the invention, the rotor is a rotor with an axial flux and is therefore intended for use in a motor or generator with an axial flux. In this embodiment, the at least one support 2, 2a is in the form of a disc and is partly hollow comprising branches 3, 3a that extend essentially radially or at an inclination in the radial direction between an internal circumference 18 that internally delimits a passage for a rotation shaft of the rotor 1, and an external ring 17 of the support 2 forming the external ring of the support 2. This is shown in FIGS. 1a, 1b, 2a and 2b.

The branches 3, 3a can be inclined in relation to the rotation shaft of the rotor as if they were screw blades and have a width that increases with the distance from the center of the support.

The external periphery can have edges that are curved radially toward the interior of the support 2 to form axial stops for the end portions of magnet structures 6 composed of the cellular mesh structure and the individual magnets introduced into the external periphery 17.

In the second embodiment, the at least one disc-shaped support 2a can be covered on at least one face by a covering disc 8 as axial retention means for the consolidation of the rotor. This can be done on the two opposite faces by a respective covering disc 8.

In the second embodiment, the rotor 1, 1a can have a peripheral external ring forming its edge, whereby a binding band 9 is installed on the peripheral external ring 17 making it possible to retain the individual magnets 4 against a centrifugal force.

In the second embodiment, each magnet structure 6 composed of the mesh structure 5a and the individual magnets 4 can comprise housings or cells 5 that may or may not extend all the way through each face of the disc-shaped support 2a. Each of the individual magnets 4 housed in a respective housing or cell 5 can therefore emerge on each face from the disc-shaped support 2a.

FIG. 2a shows the separation branches 3 of two adjacent magnet structures 6.

As shown in FIG. 2b, at least two magnet structures 6 composed of a mesh structure 5a and individual magnets 4 essentially forming a ring can be separated by a wall 19 in the middle of the disc-shaped support 2. The magnet structures 6 can be one-piece discs or separated by the branches 3a.

The following description can apply to both preferred embodiments of the present invention.

The magnet structures 6, each composed of the mesh structure 5a and individual magnets 4, can be rigidly fastened to the at least one support 2, 2a by fastening means based on ferrous materials, synthetic materials or composite materials.

The rigid fastening means can be an integral part of the rotor and/or can be additional parts attached to the rotor. The additional parts can be welded, bolted, riveted or snapped onto the rotor 1, 1a. It is possible to provide rigid fastening means between each individual magnet 4 and the housing or cell 5 that contains it, with the fastening means on the internal face of the housing or cell 5 of the separation walls 19 that delimit the cell in relation to the adjacent housings or cells 5.

In each magnet structure 6 composed of the cellular mesh structure 5a and the individual magnets 4, the housings or cells 5 can be delimited by separation walls 19, each individual magnet 4 being permanently installed in its respective housing or cell 5 by resin 20, adhesive bonding or welding.

The individual magnets 4 and their respective housings or cells 5 can be of variable shapes with their poles oriented in parallel or diverging directions. For example, the dimensions of the housings or cells 5 can differ from one housing or cell 5 to another. The housings or cells 5 do not absolutely have to be in the shape of a hexagon, although that is a preferred shape.

The electromagnetic actuator can comprise at least one stator that carries at least one winding, the electromagnetic motor or generator including one or more air gaps between the at least one rotor and the at least one stator, of one or more stators that carry the winding.

Each stator can comprise a magnetic circuit associated with a winding. The stator can have open or closed teeth or notches. A casing makes it possible to protect the electromagnetic motor or generator. The stators can be connected in series or in parallel. The offset of one stator from another by an angle, combined with the shape of the notches in the shape of the individual magnets 4, makes it possible to reduce the torque variation and the detent torque.

The actuator can be an electromagnetic motor or generator and can operate at very high speeds with or without a speed step-up gear. The motor or the generator can comprise at least two stators connected in series or in parallel or at least two rotors.

The rotor can comprise a rotation shaft that extends perpendicular to the circular faces of the rotor 1, 1a and traverses the two stators. The rotor 1, 1a can be carried by at least two roller bearings, with one roller bearing associated with a respective stator to allow it to rotate with reference to the stators.

The invention claimed is:

1. A three-dimensional magnet structure (6) constituted by a plurality of individual magnets (4), the magnet structure (6) having a thickness forming its smallest dimension, each individual magnet being in the form of an elongated block (4) having a length (4a) extending along the thickness of the magnet structure (6), the elongated block (4) being cylindrical or in the form of a polyhedron with at least one flat longitudinal face (4b) oriented toward a working surface of the magnet structure (6), the elongated block (4) having a line of magnetization extending along its length, the individual magnets (4) being positioned in the magnet structure (6) at a distance from one another so that they are electrically isolated from one another, the length (4a) of each block (4) being greater than the diameter of the flat longitudinal face for a cylindrical block or to a longer diagonal line (4c) connecting two apexes of this longitudinal face (4b) for a block (4) in the form of a polyhedron characterized in that the magnet structure (6), comprises at least one mesh structure (5a) comprising a plurality of housings (5) for a respective individual magnet (4), the at least one mesh structure (5a) being in the form of a honeycomb that has housings (5) with a hexagonal cross section and each individual magnet (4) being adhesively bonded in a respective housing (5) by a fiber-reinforced resin (20) and in that the magnet structure (6) comprises a layer of non-conducting composite (21) coating the individual magnets (4), the composite layer (21) delimiting a complete exterior outline of the magnet structure (6) and comprising reinforcement fibers such as glass fibers or fibers of plastic material.

2. The magnet structure of claim 1, in which a single-layer or multi-layer material is introduced into the space between the housing (5) and the individual magnet (4).

3. The method for the fabrication of the magnet structure (6) of claim 1, characterized in that it comprises the following steps:

cutting, from a magnetized tile having a length, width and thickness forming three dimensions of the tile, of the plurality of individual magnets (4) along the three dimensions of the magnetized tile;

positioning and holding of the individualized magnets (4) by bonding at a distance from one another, the positioning is performed by the introduction of the individual magnets (4) into the mesh structure (5a), each individual magnet (4) being adhesively bonded in a respective housing (5) of the mesh structure (5a) by the fiber-reinforced resin (20);

injection of the composite layer (21) around the individual magnets (4) to coat them, the composite layer (21) delimiting the entire exterior profile of the magnet structure (6).

4. The magnet structure (6) of claim 1, in which a ratio of a surface area of the longitudinal face (4b) of the block (4) to the working surface of the magnet structure (6) is less than 2%.

5. The magnet structure (6) of claim 1, in which each block (4) has its flat longitudinal face (4b) in the shape of a hexagon.

6. The magnet structure (6) of claim 1, which comprises a stack of two series of individual magnets (4), each individual magnet (4) of a series being aligned in the direction of its length with a respective individual magnet (4) of the other series with which it is placed end to end.

7. The magnet structure (6) of claim 6, which comprises a stack of two series of at least two individual magnets (4), the two series being stacked one on the other, a layer of composite being interposed between the two stacked series.

8. A linear or rotating electromagnetic actuator, characterized in that it comprises a single magnet structure (6) or a plurality of magnet structures (6), as recited in claim 1, the magnet structure or structures (6) forming a rectangular assembly or being part of a rotor (1, 1a) that rotates around its center, the magnet structure or structures (6) being arranged concentrically with respect to the rotor (1, 1a).

9. The electromagnetic actuator as recited in claim 8 in which, when single, the magnet structure (6) forms a single magnet that extends over the actuator or, when multiple, the magnet structures (6) are successive tiles forming alternating successive magnet poles.

10. The electromagnetic actuator as recited in claim 8 in which, when the actuator is an axial flux actuator, there are a plurality of magnets structures (6), being successive tiles forming alternating successive magnet poles, the magnet structures (6) being housed in at least one support (2, 2*a*) comprising branches (3, 3*a*) delimiting housings between them, each of which holds a respective magnet structure (6), the at least one support (2, 2*a*) being part of a rotor (1) and having a partly hollowed disk shape comprising branches (3) extending essentially radially or at an inclination in the radial direction of the rotor (1), the at least one disc-shaped support (2) being covered on at least one face by a covering disc (8) as axial holding means for the consolidation of the rotor (1).

11. The electromagnetic actuator of claim 8, in which the rotor (1) has an outer peripheral ring (17) forming its edge, a binding band (9) being installed on the peripheral outer ring (17) making it possible to retain the magnet structures (6).

\* \* \* \* \*